United States Patent
Basso et al.

(10) Patent No.: US 6,668,261 B1
(45) Date of Patent: Dec. 23, 2003

(54) METHOD OF UPGRADING A PROGRAM USING ASSOCIATED CONFIGURATION DATA

(75) Inventors: Claude Basso, Nice (FR); Jean-Marc Berthaud, Villeneuve-Loubet (FR); Alain Dorel, La Gaude (FR); Jean-Pierre Rigaud, Nice (FR); Michel Susini, St Laurent du Var (FR); Fred Trucco, Gattieres (FR)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 09/621,401

(22) Filed: Jul. 21, 2000

(30) Foreign Application Priority Data

Jul. 29, 1999 (EP) .............................. 99480070

(51) Int. Cl.[7] .............................. G06F 17/30
(52) U.S. Cl. .................... 707/203; 707/205; 717/136; 715/511
(58) Field of Search ................. 707/1–10, 200–203, 707/204–206; 717/170, 136; 703/22, 26

(56) References Cited

U.S. PATENT DOCUMENTS

| | | | | |
|---|---|---|---|---|
| 4,558,413 A | * | 12/1985 | Schmidt et al. ............. | 707/203 |
| 4,627,019 A | * | 12/1986 | Ng ................................. | 707/8 |
| 5,642,503 A | * | 6/1997 | Reiter ........................... | 707/8 |
| 5,740,405 A | * | 4/1998 | DeGraaf ....................... | 703/22 |
| 5,758,154 A | | 5/1998 | Qureshi ...................... | 395/651 |
| 5,764,992 A | | 6/1998 | Kullick et al. .............. | 717/170 |
| 5,771,381 A | | 6/1998 | Jones et al. ................. | 713/100 |
| 5,867,174 A | | 2/1999 | Aoki et al. .................. | 345/472 |
| 6,377,960 B1 | * | 4/2002 | Qiu et al. .................... | 707/203 |
| 6,421,679 B1 | * | 7/2002 | Chang et al. ........... | 707/103 R |

OTHER PUBLICATIONS

Anton Chernoff et al., A Profile–Directed Binary Translator, Mar. 4, 1998, IEEE.*

* cited by examiner

*Primary Examiner*—Shahid Alam
*Assistant Examiner*—Jean Bolte Fleurantin
(74) *Attorney, Agent, or Firm*—Bracewell and Patterson

(57) ABSTRACT

A method of upgrading a program, used in a data processing device having a permanent memory, from a version n to a version n+1, wherein, at any time, both the recent version and the previous version of the program are stored in a first and a second location of the memory. Each one of version n and version n+1 of the program is using configuration data of format n and format n+1, respectively, when it is used as a current version. The configuration data of format n are automatically stored into the memory when version n+1 of the program is stored into the second location of memory.

12 Claims, 3 Drawing Sheets

METHOD OF UPGRADING A PROGRAM USING ASSOCIATED CONFIGURATION DATA

BACKGROUND OF THE INVENTION

1. Field of the Invention

The invention relates generally to configurable data processing devices running an upgradable program or microcode the configuration of which requires at least some mandatory parameters, and relates particularly to a method of upgrading a program using associated configuration data.

2. Description of the Related Art

Configurable network devices have generally a lot of configuration parameters. For a network device to perform a task, some parameters can use factory default values but other ones cannot. The parameters which can keep factory default values are called optional parameters. The parameters that cannot keep factory default values are called mandatory parameters.

When connecting such a device for the first time to the network, the user has to configure these mandatory parameters and can also perform more fine-tuning of the device by changing the values of the optional parameters. Once this operation is completed, the device is operational and its configuration parameters are saved as a configuration file in a permanent memory such as an NVRAM.

During the device life, the microcode development engineering of the device perform function enhancement and bug fixes of the microcode when necessary. These bug fixes and function enhancement are grouped in a new microcode version having a number n+1 whereas the most recent version of the microcode has a number n. Because of the new functions, the format of the configuration file may change because it contains new record sizes, new values, or new entries.

Each program version can be installed by the user following upgrading instructions. When the user wants to change, inside the device, the microcode version n by a microcode version n+1, for a safety reason he expects to be able to easily return to microcode version n in case of failure of the device when running microcode version n+1. This is generally made by storing version n+1 into an alternate location. Once version n+1 is activated, the location where version n is stored becomes the alternate location for a future upgrade of the program with a version n+2. Doing so, there are always two versions of the microcode inside the device. So, a command called SWAP MICROCODE can be provided to activate any one of these microcode versions.

When changing version n by version n+1, the user also expects not to have to re-enter all the device configuration parameters before its device becomes operational again. When version n+1 is first activated after version n, version n+1 finds the- configuration file that version n has saved in memory. Microcode version n+1 being more recent than the previously running microcode version n, the software development engineering may implement the translation function for version n+1 to be able to understand the configuration file associated with version n. During such a translation, record sizes are re-computed, old values are translated into new values and new entries are initialized with values that allow the device to operate anyway. Once translated, the configuration file is stored into memory as a new configuration file associated with microcode version n+1. The device probably operates properly and the user can take benefits of the new functions and bug fixes.

But, if the user experiences troubles in the device operation with the microcode version n+1, he may want to re-activate microcode version n. Doing so, the newly activated microcode version n finds in the memory a configuration file formatted and stored by a more recent version. In other words, the microcode finds record sizes, values, and entries that did not exist at the time version n was implemented by development engineering. So, microcode has no other choice than retrieving factory default parameters. But, as mandatory parameters are no longer set, the device is no longer operational.

Two methods can be used to solve the above problem. The first method consists in saving the configuration file associated with version n onto a diskette on a hard disk. Unfortunately, diskette or hard disk drives are not always present on devices used in a network because of failure rates. The second method consists in retrieving the configuration file from a server onto which the user has previously uploaded it before activating version n+1. But this requires a configuration of mandatory parameters for the device to be able to reach the network server prior to downloading the configuration file.

SUMMARY OF THE INVENTION

Accordingly, the object of the invention is to achieve a method of upgrading a program wherein the configuration data associated with the previous version of the microcode are automatically stored when this previous version is replaced by a new version.

The invention relates, therefore, to a method of upgrading a program used in any data processing device having a permanent memory, in particular a network device, from a version n to a version n+1, wherein, at any time, both the recent version and the previous version of the program are stored in a first and a second location of the memory, each one of version n and version n+1 using, respectively, configuration data of format n or format n+1 when used as the current version, and the configuration data of format n being automatically stored into the memory while the version n+1 of the program is stored into the second location of the memory.

BRIEF DESCRIPTION OF THE DRAWINGS

The above and other objects, features, and advantages of the invention will be better understood by reading the following more particular description of the invention in conjunction with the accompanying drawings wherein.

DETAILED DESCRIPTION OF A PREFERRED EMBODIMENT

Figure 1:
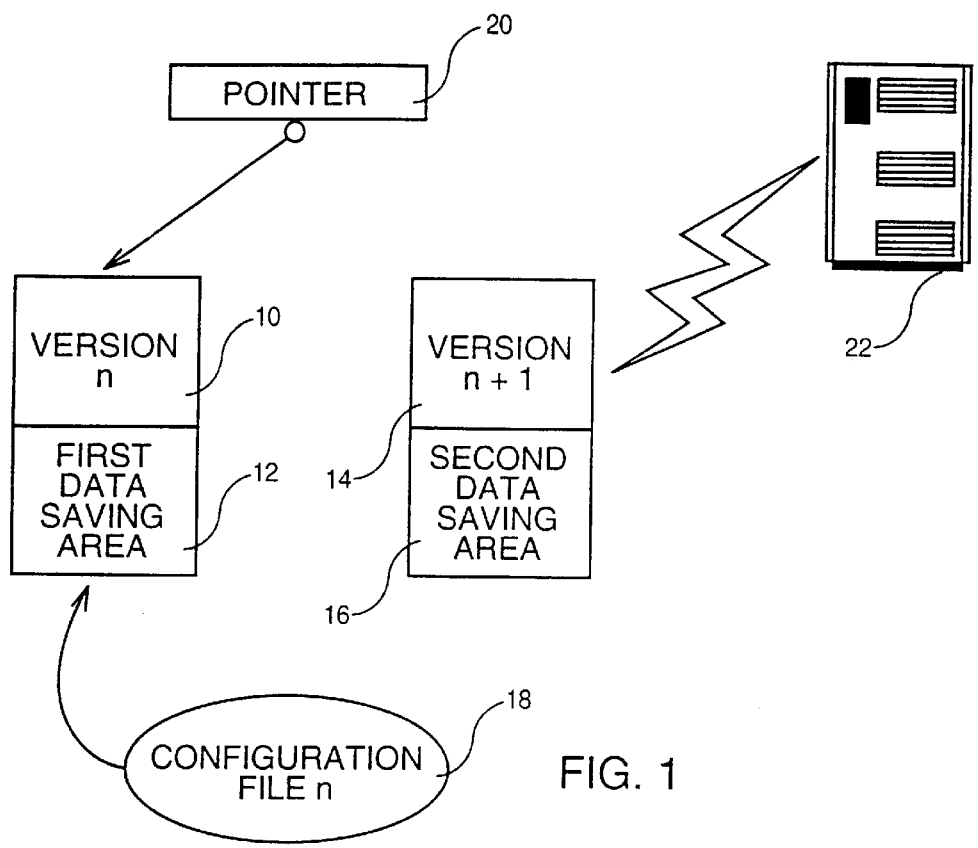
FIG. 1 represents schematically the first step according to the invention wherein the current configuration file is automatically saved when a new version of the program is stored into memory.

As illustrated in FIG. 1, a first location 10 in the permanent memory of the device such as an NVRAM in a network device (but which could be any data processing device) is used to store the current version n of the program and a first saving area 12 is associated with this first location to save configuration data. Likewise, a second memory location 14 is used as an alternate location to store an upgraded version of the program, and this second location is also associated with a data saving area 16. Note that the active configuration file of format n used by the current version of the program is stored in a configuration location 18 of the memory.

At the beginning, a pointer 20 of the active program points to the first memory location since it contains the current version n of the program. Assuming that an upgraded version n+1 has to replace version n, this second version is downloaded for example from a server 22 to alternate location 14. According to the principles of the invention, the active configuration data stored in configuration location 20 are automatically saved in first data saving area 12.

Figure 2:
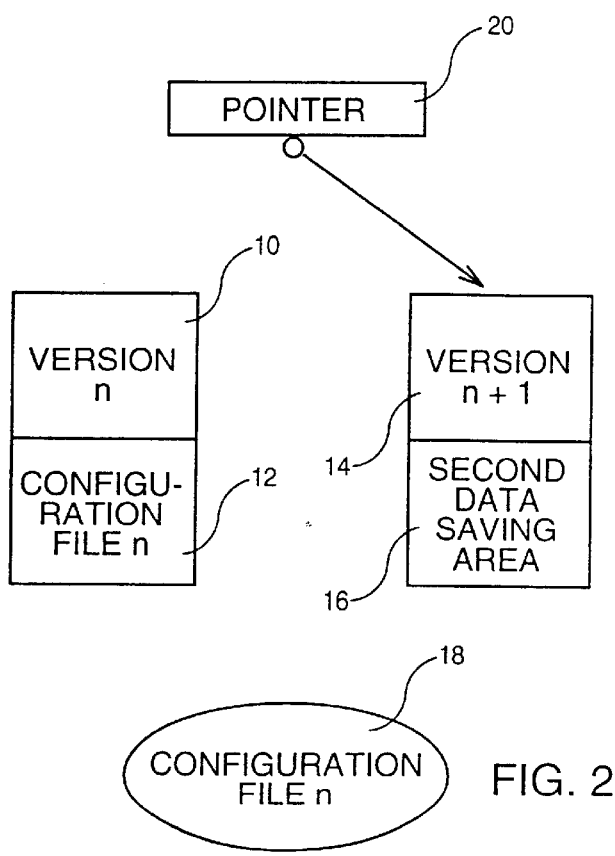
FIG. 2 represents schematically the state of the device at the end of the step represented in FIG. 1 when the new version of the program is being used.

Accordingly, when pointer of the active program 20 points to the upgraded version n+1 stored in alternate location 14 as illustrated in FIG. 2, configuration file n is saved in first data saving area 12 associated with first memory location 10.

Figure 3:
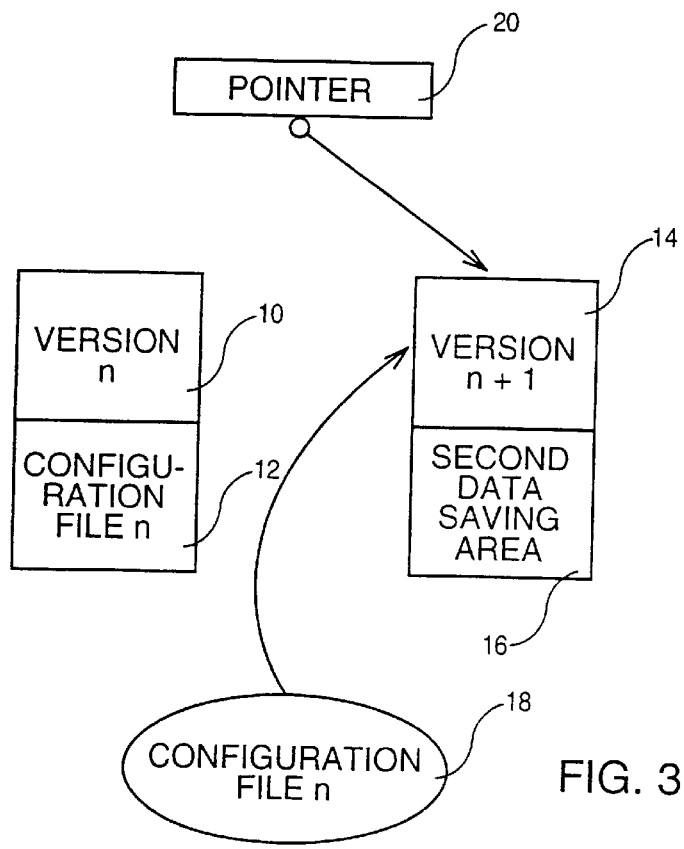
FIG. 3 represents schematically the step of the translation of the current configuration file by the new version of the program.
Figure 4:
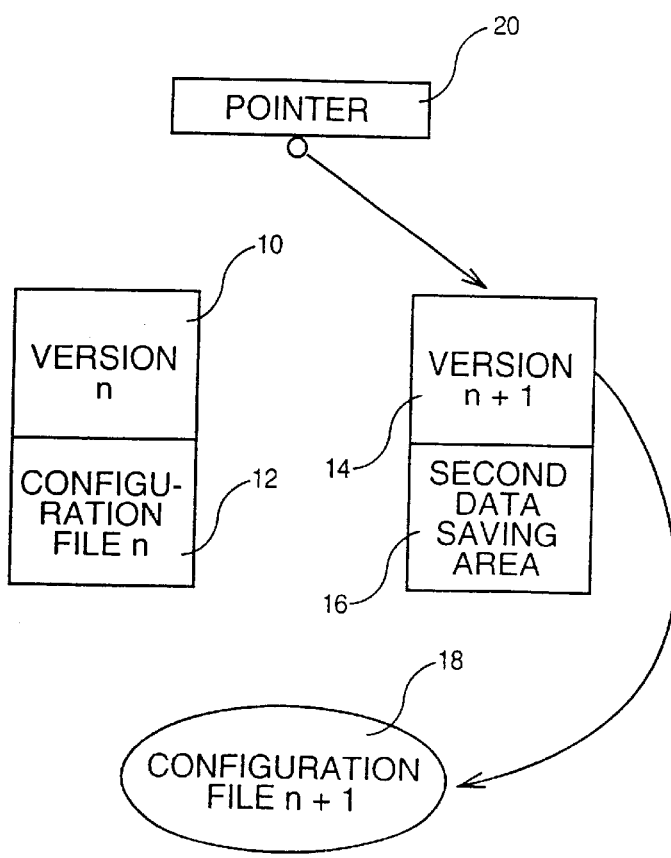
FIG. 4 represents schematically the replacement of the current configuration file by the translated configuration file at the end of the translation step represented in FIG. 3.

Then, program version n+1 has to access the configuration file stored in configuration location 18 and to translate it as illustrated in FIG. 3 in order to change record sizes and old values into new ones and to initialize new entries with values permitting the device to operate. Once translated, the new configuration file n+1 is stored into configuration location 18 as the active configuration file as illustrated in FIG. 4.

Figure 5:
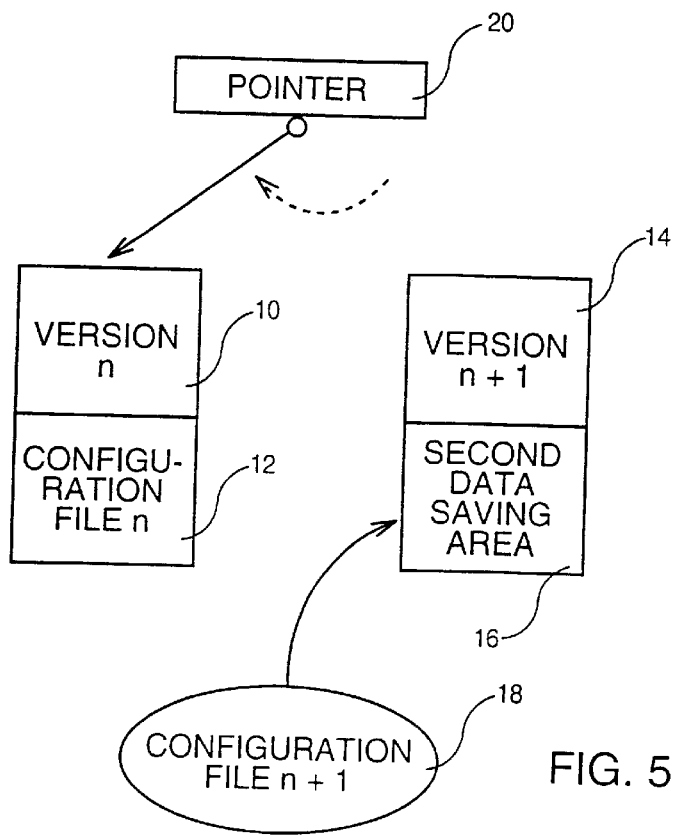
FIG. 5 represents schematically the state of the device when the user decides to come back to the previous version of the program.
Figure 6:
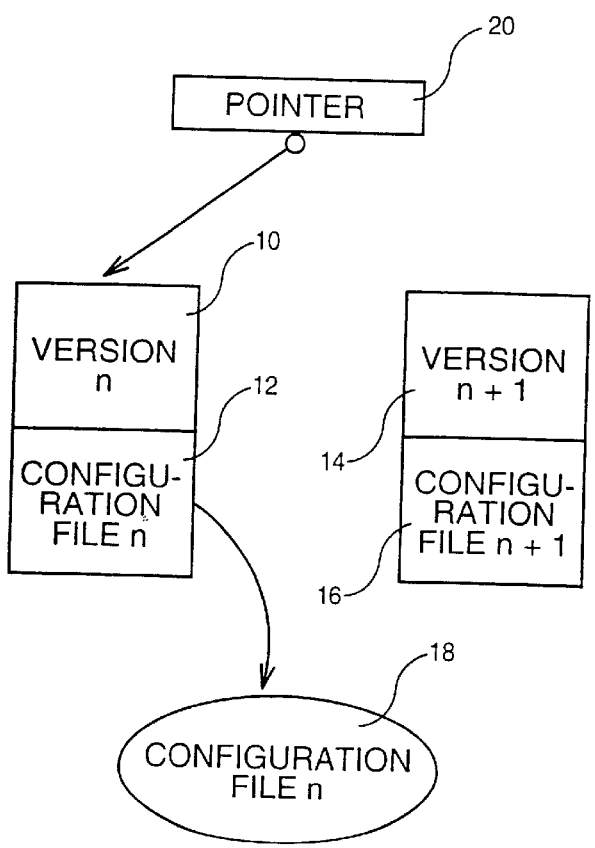
FIG. 6 represents the step of taking the saved configuration file associated with the previous version of the program as the active configuration file when the previous version of the program is used.

Assuming that the user wants to again use the version n of the program, pointer 20 points to first location 10 containing version n as illustrated in FIG. 5. As previously when the current version has become n+1, the active configuration file n+1 is automatically saved in the second data saving area 16 associated with second memory location 14 wherein version n+1 is stored. At this time, configuration location 18 contains configuration file n+1 which is not adapted to version n of the program. It is why the configuration file n which is saved in first data saving area 12 is transferred into configuration location 18 as soon as version n replaces version n+1 as illustrated in FIG. 6.

It must be noted that, one version n+1 of the program stored in the second location 14 of the memory, the first location 10 becomes the alternate location for a future program upgrading with a version n+2. This means that there are always two operational versions of the program in the device, the most recent version and the immediately preceding version.

Modifications could be brought to the invention without changing its principle which is to save automatically the configuration file associated with a program version in case of program upgrading in order for the user to be able to use the previous version. Thus, a common key could be allocated to both version of the program and associated configuration file so that the right configuration file can be easily determined by looking for the key.

What is claimed is:

1. A method for facilitating software upgrade within a data processing system, said method comprising:

storing a first version of a software program in a first location of a memory within a data processing system;

storing an active configuration file having information in a first data format usable by said first version of said software program in a configuration location of said memory;

assigning a pointer of said software program to point to said first location of said memory; and in response to a request for upgrading said software program from said first version to a second version,
storing said second version of said software program in a second location of said memory;
assigning said pointer of said software program to point to said second location of said memory; and
automatically translating information in said active configuration file to a second data format usable by said second version of said software program.

2. The method of claim 1, wherein said translating further includes storing said active configuration file in said second data format in a same memory location as said active configuration file in said first data format.

3. The method of claim 1, further comprising:

storing a first set of configuration data in a first saving area of said memory;

storing a second set of configuration data in a second saving area of said memory;

associating said first set of configuration data with said first version of said software program during an execution of said first version of said software program; and associating said second set of configuration data with said second version of said software program during an execution of said second version of said software program.

4. The method of claim 3, further comprising automatically associating said active configuration file with said second set of configuration data in response to said software program update request.

5. The method of claim 1, further comprising in response to a request for returning said software program from said second version to said first version, assigning said pointer of said software program to point to said first location of said memory; and automatically translating information in said active configuration from said second data format usable by said second version of said software program back to said first data format usable by said first version of said software program.

6. The method of claim 5, further comprising associating said active configuration file with said first set of configuration data.

7. A computer program product residing on a computer usable medium for facilitating software upgrade within a data processing system, said computer program product comprising:

program code means for storing a first version of a software program in a first location of a memory within a data processing system;

program code means for storing an active configuration file having information in a first data format usable by said first version of said software program in a configuration location of said memory;

program code means for assigning a pointer of said software program to point to said first location of said memory; and in response to a request for upgrading said software program from said first version to a second version, program code means for storing said second version of said software program in a second location of said memory;

program code means for assigning said pointer of said software program to point to said second location of said memory; and program code means for automatically translating information in said active configuration to a second data format usable by said second version of said software program.

8. The computer program product of claim 7, wherein said program code means for translating further includes program code means for storing said active configuration file in said second data format in a same memory location as said active configuration file in said first data format.

9. The computer program product of claim 7, further comprising:

program code means for storing a first set of configuration data in a first saving area of said memory;

program code means for storing a second set of configuration data in a second saving area of said memory;

program code means for associating said first set of configuration data with said first version of said software program during an execution of said first version of said software program; and program code means for associating said second set of configuration data with said second version of said software program during an execution of said second version of said software program.

10. The computer program product of claim 9, further comprising program code means for automatically associating said active configuration file with said second set of configuration data in response to said software program update request.

11. The computer program product of claim 7, further comprising in response to a request for returning said software program from said second version to said first version, program code means for assigning said pointer of said software program to point to said first location of said memory; and program code means for automatically translating information in said active configuration from said second data format usable by said second version of said software program back to said first data format usable by said first version of said software program.

12. The computer program product of claim 11, further comprising program code means for associating said active configuration file with said first set of configuration data.

\* \* \* \* \*